United States Patent
Martin et al.

(10) Patent No.: US 11,809,493 B2
(45) Date of Patent: Nov. 7, 2023

(54) SYSTEM AND METHOD FOR TOKENIZATION OF DATA

(71) Applicant: MICRO FOCUS LLC, Santa Clara, CA (US)

(72) Inventors: Luther Martin, Santa Clara, CA (US); Timothy Roake, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/152,579

(22) Filed: Jan. 19, 2021

(65) Prior Publication Data

US 2022/0229869 A1 Jul. 21, 2022

(51) Int. Cl.
*G06F 16/901* (2019.01)
*G06F 16/903* (2019.01)
*H04L 9/06* (2006.01)
*G06Q 20/38* (2012.01)

(52) U.S. Cl.
CPC ...... *G06F 16/902* (2019.01); *G06F 16/90344* (2019.01); *H04L 9/065* (2013.01); *H04L 9/0643* (2013.01); *G06Q 20/3827* (2013.01)

(58) Field of Classification Search
CPC ............. G06F 16/902; G06F 16/90344; H04L 9/0643; H04L 9/065
USPC ........................................................ 707/793
See application file for complete search history.

(56) References Cited

U.S. PATENT DOCUMENTS

| | | | |
|---|---|---|---|
| 5,548,648 A * | 8/1996 | Yorke-Smith | H04L 9/14 380/37 |
| 7,000,829 B1 * | 2/2006 | Harris | G06Q 20/3829 235/382 |
| 7,248,691 B1 * | 7/2007 | Pandit | H04L 9/3236 713/180 |
| 8,458,487 B1 * | 6/2013 | Palgon | G06F 21/6254 713/193 |
| 8,620,882 B2 * | 12/2013 | Griffin | H04L 63/105 709/219 |
| 8,935,802 B1 * | 1/2015 | Mattsson | G06F 21/60 726/26 |
| 8,978,152 B1 * | 3/2015 | Rozenberg | H04L 63/0428 726/26 |
| 9,038,157 B1 * | 5/2015 | Santiago, Jr. | G06F 21/35 726/9 |
| 9,081,978 B1 * | 7/2015 | Connolly | G06F 21/10 |
| 9,361,085 B2 * | 6/2016 | El-Gillani | G06F 8/65 |
| 9,830,476 B2 * | 11/2017 | Fontecchio | H04L 9/0822 |
| 10,025,941 B1 * | 7/2018 | Griffin | G06F 21/6209 |

(Continued)

*Primary Examiner* — Tony Mahmoudi
*Assistant Examiner* — Michael Le
(74) *Attorney, Agent, or Firm* — Sheridan Ross P.C.

(57) ABSTRACT

A non-tokenized string is received. For example, a non-tokenized string could be a credit card number. The non-tokenized string is partitioned into a plurality of non-tokenized substrings. For example, if the credit card number is 16 digits long, it may be partitioned into substrings that are three, six, and seven digits in length. The non-tokenized substrings are used as an index into a plurality of lookup tables. As a result of the indexing, a plurality of tokenized substrings are retrieved. The plurality of tokenized substrings are combined into a tokenized string. The tokenized string is used as a token that represents the credit card number without disclosing the actual credit card number. The reverse of the above process can also occur.

20 Claims, 5 Drawing Sheets

(56) References Cited

U.S. PATENT DOCUMENTS

| | | | |
|---|---|---|---|
| 10,026,080 B2* | 7/2018 | Sahasranaman | G06Q 20/24 |
| 10,366,053 B1* | 7/2019 | Zheng | G06N 20/00 |
| 10,541,982 B1* | 1/2020 | Lee | G06F 40/211 |
| 10,615,965 B1* | 4/2020 | Goldberg | H04L 67/146 |
| 10,956,560 B1* | 3/2021 | Sanchez | H04L 9/3226 |
| 11,206,131 B1* | 12/2021 | Griffin | H04L 9/0869 |
| 11,388,148 B2* | 7/2022 | Troitsky | H04L 63/0807 |
| 11,410,173 B1* | 8/2022 | Stickle | H04L 9/3234 |
| 2002/0099942 A1* | 7/2002 | Gohl | H04L 9/0869 713/169 |
| 2002/0172425 A1* | 11/2002 | Venkatesan | G06F 40/194 382/229 |
| 2003/0126451 A1* | 7/2003 | Gorobets | G06F 21/79 713/193 |
| 2003/0163427 A1* | 8/2003 | Fung | G06Q 20/20 705/51 |
| 2003/0177187 A1* | 9/2003 | Levine | H04L 67/52 709/205 |
| 2004/0052377 A1* | 3/2004 | Mattox | H04N 21/4623 348/E7.056 |
| 2006/0116966 A1* | 6/2006 | Pedersen | G06F 21/64 705/59 |
| 2007/0101435 A1* | 5/2007 | Konanka | G06F 21/57 713/193 |
| 2007/0168292 A1* | 7/2007 | Jogand-Coulomb | G06F 21/6218 705/52 |
| 2008/0229103 A1* | 9/2008 | Mutka | H04L 63/0876 713/168 |
| 2009/0177894 A1* | 7/2009 | Orsini | H04L 9/321 713/193 |
| 2009/0226056 A1* | 9/2009 | Vlachos | G06T 1/0071 382/128 |
| 2009/0228680 A1* | 9/2009 | Reddy | G06F 11/1453 711/216 |
| 2009/0249082 A1* | 10/2009 | Mattsson | G06Q 20/4016 713/193 |
| 2009/0249492 A1* | 10/2009 | Boesgaard Sorensen | G06F 21/556 717/136 |
| 2009/0310778 A1* | 12/2009 | Mueller | H04L 9/0625 380/28 |
| 2010/0074441 A1* | 3/2010 | Pauker | H04L 9/0625 713/168 |
| 2010/0199098 A1* | 8/2010 | King | H04L 9/3213 713/182 |
| 2010/0257612 A1* | 10/2010 | McGuire | G06Q 20/383 726/26 |
| 2010/0284532 A1* | 11/2010 | Burnett | G06F 21/6245 341/51 |
| 2010/0287171 A1* | 11/2010 | Schneider | G06F 16/9014 707/769 |
| 2011/0078779 A1* | 3/2011 | Liu | G06F 21/6254 726/28 |
| 2011/0103579 A1* | 5/2011 | Martin | G06F 21/602 714/E11.032 |
| 2011/0138192 A1* | 6/2011 | Kocher | G06F 8/71 713/189 |
| 2011/0138465 A1* | 6/2011 | Franklin | G06F 21/564 726/23 |
| 2011/0213807 A1* | 9/2011 | Mattsson | G07F 7/1008 709/219 |
| 2011/0246817 A1* | 10/2011 | Orsini | H04L 63/08 714/E11.062 |
| 2011/0258123 A1* | 10/2011 | Dawkins | H04L 63/0428 705/64 |
| 2011/0296440 A1* | 12/2011 | Launch | H04L 67/1097 719/326 |
| 2011/0302166 A1* | 12/2011 | Moriya | G06F 16/3331 707/E17.046 |
| 2011/0307710 A1* | 12/2011 | McGuire | G06Q 20/382 726/9 |
| 2012/0278897 A1* | 11/2012 | Ang | H04L 61/301 726/26 |
| 2012/0304273 A1* | 11/2012 | Bailey | G06Q 20/3823 726/9 |
| 2013/0010966 A1* | 1/2013 | Li | H04L 9/085 380/278 |
| 2013/0046995 A1* | 2/2013 | Movshovitz | H04L 9/0662 713/189 |
| 2013/0103685 A1* | 4/2013 | Preneel | G06F 16/2282 707/769 |
| 2013/0168450 A1* | 7/2013 | von Mueller | H04L 9/0618 235/449 |
| 2013/0212666 A1* | 8/2013 | Mattsson | G06Q 20/3823 726/9 |
| 2013/0232077 A1* | 9/2013 | Bauer | G06Q 20/401 705/44 |
| 2014/0059088 A1* | 2/2014 | Mattsson | G06F 16/258 707/803 |
| 2014/0090081 A1* | 3/2014 | Mattsson | G06F 21/6227 726/27 |
| 2014/0177825 A1* | 6/2014 | Mattsson | H04L 9/06 380/28 |
| 2014/0230072 A1* | 8/2014 | Mattsson | G07F 7/1008 726/26 |
| 2014/0304515 A1* | 10/2014 | Feuerman | H04L 63/123 713/176 |
| 2014/0344195 A1* | 11/2014 | Drew | G06F 16/35 706/12 |
| 2015/0082399 A1* | 3/2015 | Wu | H04L 9/0897 726/10 |
| 2015/0095252 A1* | 4/2015 | Mattsson | G06F 16/258 705/325 |
| 2015/0095367 A1* | 4/2015 | Mattsson | H04L 9/3213 707/769 |
| 2015/0096038 A1* | 4/2015 | Mattsson | H04L 9/0637 726/26 |
| 2015/0096040 A1* | 4/2015 | Mattsson | G06F 21/64 726/26 |
| 2015/0096056 A1* | 4/2015 | Mattsson | H04L 63/0428 726/29 |
| 2015/0312246 A1* | 10/2015 | Mattsson | G06F 21/6254 726/26 |
| 2015/0363772 A1* | 12/2015 | Ronca | G06Q 20/3829 705/71 |
| 2016/0070917 A1* | 3/2016 | Rozenberg | G06F 21/6254 726/26 |
| 2016/0070927 A1* | 3/2016 | Mattsson | G06F 21/6245 726/27 |
| 2016/0119289 A1* | 4/2016 | Jain | H04L 63/0281 726/12 |
| 2016/0210470 A1* | 7/2016 | Rozenberg | G06F 16/284 |
| 2017/0116136 A1* | 4/2017 | Macnicol | G06F 12/1408 |
| 2017/0200022 A1* | 7/2017 | Mattsson | G06F 16/90344 |
| 2017/0214521 A1* | 7/2017 | Busch | H04L 9/0618 |
| 2018/0060302 A1* | 3/2018 | Liang | G06F 16/35 |
| 2018/0062832 A1* | 3/2018 | Hatcher | H04L 63/0428 |
| 2018/0144152 A1* | 5/2018 | Greatwood | G06F 21/602 |
| 2018/0145826 A1* | 5/2018 | Greatwood | G06F 3/067 |
| 2018/0285597 A1* | 10/2018 | Mahonin | H04L 9/3239 |
| 2018/0302382 A1* | 10/2018 | Lehmann | G06F 21/6254 |
| 2018/0316491 A1* | 11/2018 | Pivovarov | G06F 7/588 |
| 2018/0336263 A1* | 11/2018 | Bensberg | G06F 16/284 |
| 2019/0116046 A1* | 4/2019 | Hoyer | H04L 9/0643 |
| 2019/0158288 A1* | 5/2019 | Williamson | G06F 3/0659 |
| 2019/0207754 A1* | 7/2019 | Iyer | H04L 9/0877 |
| 2019/0245688 A1* | 8/2019 | Patin | H04L 9/321 |
| 2019/0342088 A1* | 11/2019 | Eidson | G06Q 20/385 |
| 2020/0019727 A1* | 1/2020 | Mattsson | G06F 21/6245 |
| 2020/0021428 A1* | 1/2020 | Balabine | G06F 16/903 |
| 2020/0082922 A1* | 3/2020 | Bacastow | G16H 10/60 |
| 2020/0136800 A1* | 4/2020 | Moon | H04L 9/0625 |
| 2020/0143074 A1* | 5/2020 | Steinberg | H04L 67/1097 |
| 2020/0177383 A1* | 6/2020 | Iyer | G06F 21/44 |
| 2020/0351310 A1* | 11/2020 | Leighton | G06N 20/00 |
| 2020/0374120 A1* | 11/2020 | Stanley | H04L 9/3213 |
| 2020/0387623 A1* | 12/2020 | Bayon | H04L 9/3242 |
| 2021/0182915 A1* | 6/2021 | Blaikie, III | G06Q 30/0255 |

(56) References Cited

U.S. PATENT DOCUMENTS

| | | | | |
|---|---|---|---|---|
| 2021/0256150 A1* | 8/2021 | Bayon | .................. | G06F 21/6245 |
| 2021/0258158 A1* | 8/2021 | Nelson | .................. | H04L 9/0869 |
| 2021/0390884 A1* | 12/2021 | Bush | ..................... | H04L 9/0861 |
| 2022/0067205 A1* | 3/2022 | Lindsay | ................. | G06F 40/284 |
| 2022/0114341 A1* | 4/2022 | Mattsson | .............. | G06F 40/129 |
| 2022/0121768 A1* | 4/2022 | Mattsson | ............ | G06F 16/2272 |

\* cited by examiner

SYSTEM AND METHOD FOR TOKENIZATION OF DATA

FIELD

The disclosure relates generally to tokenization of data and particularly to advanced methods of tokenization of data.

BACKGROUND

Tokenization is a popular technique for protecting sensitive data in a way that makes compliance with industry regulations cheaper and easier. The simplest form of tokenization comprises a lookup table which is used to convert a plaintext value P into a token T via T=R (P) in some table R. To do this, a distinct table R is needed for each possible token type, as determined by a radix and a string length. For example, for a radix of 10 for a six-digit string, a table of all possible six-digit values is needed to tokenize the strings (a table size of $10^6$). For even larger strings, the table sizes can be very large. For example, for a 16-digit number, if all possible combinations were used, a table size of $10^{16}$ would be needed.

SUMMARY

These and other needs are addressed by the various embodiments and configurations of the present disclosure. A non-tokenized string is received. For example, a non-tokenized string could be a credit card number. The non-tokenized string is partitioned into a plurality of non-tokenized substrings. For example, if the credit card number is 16 digits long, it may be partitioned into non-tokenized substrings that are three, six, and seven digits in length. The non-tokenized substrings are used as an index into a plurality of lookup tables. As a result of the indexing, a plurality of tokenized substrings are retrieved. The plurality of tokenized substrings are combined into a tokenized string. The tokenized string is used as a token that represents the credit card number without disclosing the actual credit card number.

The reverse of the above process can also occur. The tokenized string is portioned into a plurality of tokenized substrings. The plurality of tokenized substrings are used as an index into a plurality of tokenization tables. In response to using the plurality of tokenized substrings to index into the plurality of tokenization tables, a plurality of non-tokenized substrings are retrieved. The plurality of non-tokenized substrings combined into a non-tokenized string.

The present disclosure provides a number of advantages over the prior art. As discussed above, traditional tokenization can result in extremely large database tables if the length of the string (e.g., a number) is long. In addition, if there are a large number of strings that need to be tokenized, the amount of storage required can be extremely large and cost prohibitive. If a vendor, such as a cloud service provider, has to support multiple customers who need tokenized data, the hardware storage costs can be enormous. By portioning the non-tokenized strings into smaller pieces, the size of the lookup tables are dramatically reduced in comparison to the prior art. This results in a much more efficient database that can support a much larger number/length of tokenized strings than was previously possible using the same hardware.

Because the system can support a larger number of tokenized strings using the same hardware, it allows the system to support a higher number of transactions more efficiently and at a lower cost. The described embodiments make the existing hardware more efficient while reducing the overall cost to implement a tokenization system on a large scale which was impossible previously. These and other advantages will be apparent from the disclosure contained herein.

In addition, the tokenization processes described herein are designed to support transactions (e.g., credit card transactions) in real-time. Being able to support transactions in real-time is clearly something that cannot be done practically using a mental process. Instead, the tokenization processes described herein will only work practically in a computerized environment.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
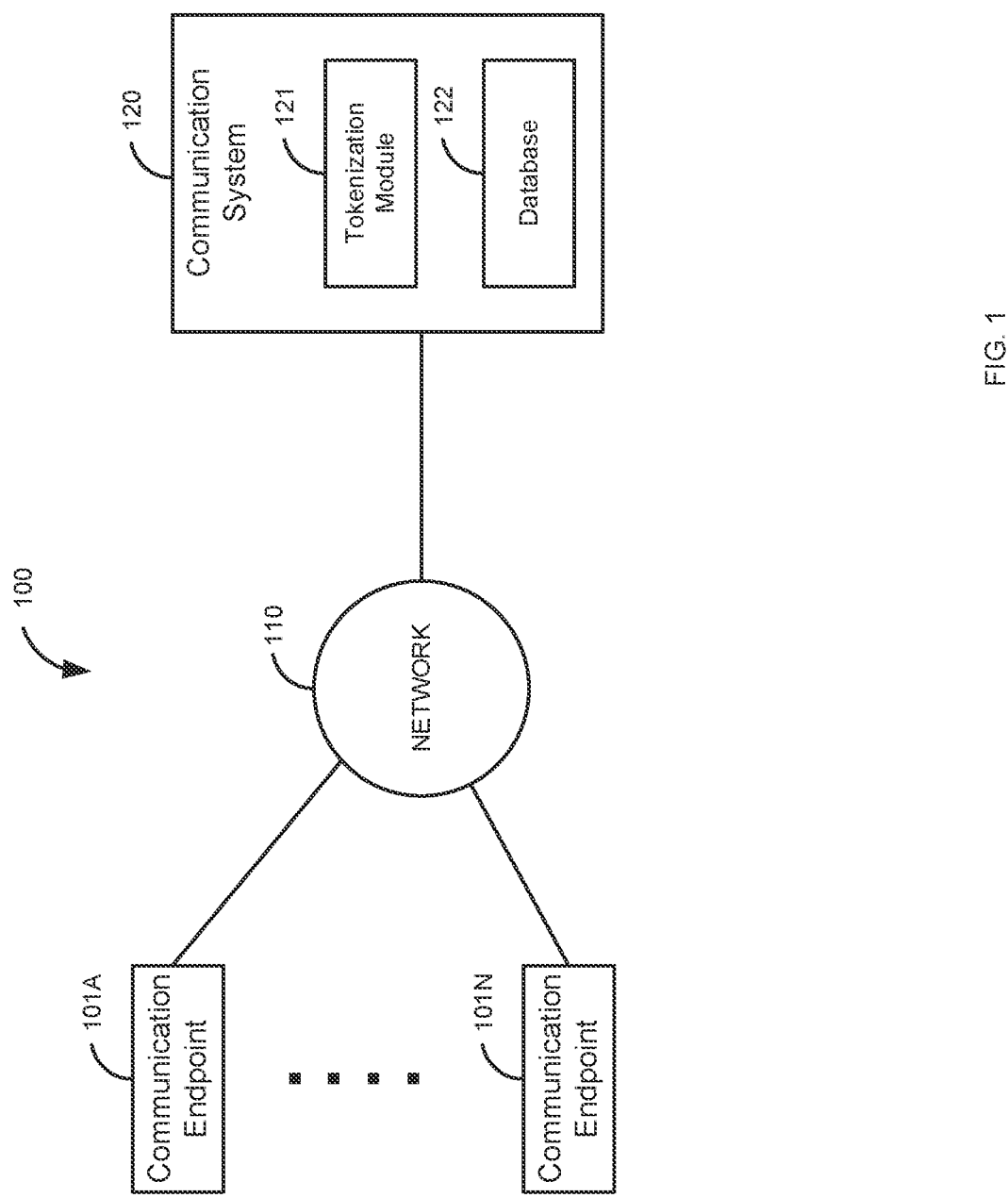
FIG. 1 is a block diagram of a first illustrative system for tokenizing data.

FIG. 1 is a block diagram of a first illustrative system 100 for tokenizing data. The first illustrative system 100 comprises communication endpoints 101A-101N, a network 110, and a communication system 120.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a server, a smart phone, a point-of sales terminal, a credit card reader, and/or the like. The communication endpoints 101A-101N are devices where a communication sessions ends. The communication endpoints 101A-101N are not network elements that facilitate and/or relay a communication session in the network, such as a communication manager or router. As shown in FIG. 1, any number of communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Hypertext Markup Language, JavaScript, Web Real-Time Protocol (Web RTC), and/or the like. Thus, the network 110 is an electronic communication network configured to carry messages via packets and/or circuit switched communications.

The communication system 120 can be or may include any type of device that can communicate with the communication endpoints 101A-101N, such as database server, a transaction server, a credit card management server, a web server, and/or the like. The communication system 120 further comprises a tokenization module 121 and a database 122.

The tokenization module 121 can be or may include any hardware/software that manages tokenization/encryption of data. Although not shown in FIG. 1, the tokenization module 121 may distributed between the communication system 120 and the communication endpoints 101A-101N. For example, the communication endpoints 101A-101N may be credit card readers that also have a tokenization module 121. The tokenization module 121 performs the tokenization processes described herein.

The database 122 can be or may include any hardware/software that can store information, such as, a relational database, an objected oriented database, a file system, a SQL database, a document store, a graph database, and/or the like. Although not shown, the database 122 may be a distributed database that is distributed on different devices on the network 110. The database 122 contains lookup tables that are described below in FIGS. 2-5.

Figure 2:
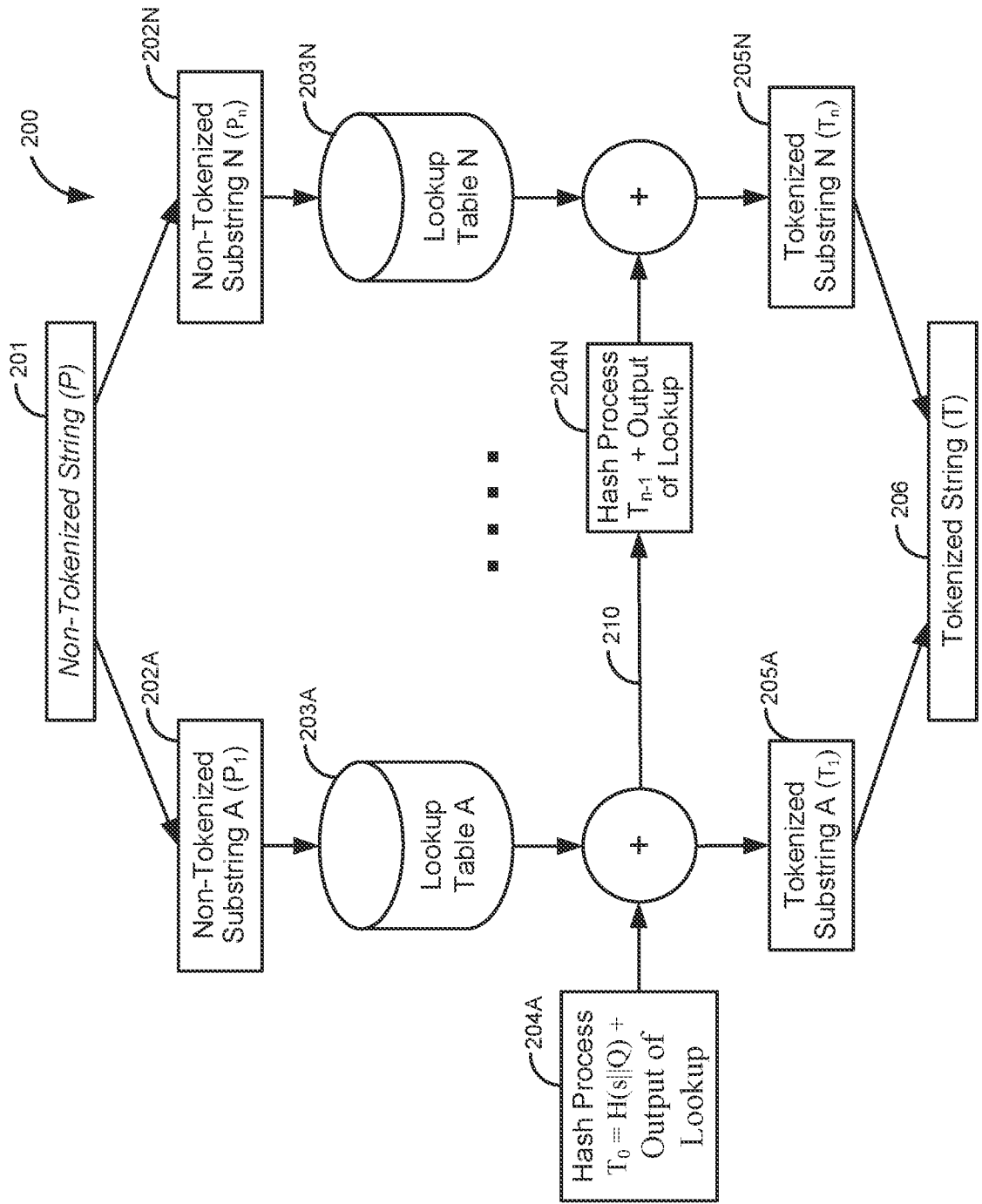
FIG. 2 is a flow/block diagram of a system for taking a non-tokenized string and converting it to a tokenized string.

FIG. 2 is a flow/block diagram of a system 200 for taking a non-tokenized string 201 and converting it to a tokenized string 206. Illustratively, the communication endpoints 101A-101N, the network 110, the communication system 120, the tokenization module 121, and the database 122 are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

FIG. 2 comprises a non-tokenized string 201, non-tokenized substrings 202A-202N, lookup tables 203A-203N, hash processes 204A-204N, tokenized substrings 205A-205N, and tokenized string 206. The non-tokenized string 201 can be a text string (e.g., a user name), a number (e.g., a social security number), a number of bytes, a number of words, a number of long words, an integer, a floating point number, an array, or any type of parameter/value. The non-tokenized string 201 may be any length.

In the discussion below, the symbol "||" denotes a concatenation (combining the strings), so that "a||b" represents the string formed by the concatenation of the two strings a and b. As described herein, concatenation/combining may also mean the strings are concatenated/combined in reverse order or different orders. The partition process begins by partitioning the non-tokenized string 201 (P) into P= $P_1||P_2|| \ldots || P_n$, wherein the non-tokenized substrings 202A-202N are $P_1$ to $P_n$. Each of the individual non-tokenized substrings 202A-202N ($P_i$) have a property that is min_length≤|$P_i$|≤max_length.

The partitioning of the non-tokenized substrings 202A-202N may be done pseudo-randomly based on the values s and Q where s is a secret value (e.g., an initial key) and Q is an encoding of a security policy. The security policy may include information, such as, which application a token works with, which customer the token is designed to be used by, and/or the like. The value s is secret wherein the value Q may not necessarily be kept secret.

In one embodiment, the value s||Q are used to initialize a Pseudorandom Number Generator (PRNG). For example, subsequent output values from the PRNG could be used to determine the length of $P_i$ for each of the non-tokenized substrings 202A-202N. Other ways to choose the lengths of the substrings are also possible. For example, the length of $P_i$ may be user administrable and/or may be based on a different algorithm.

The non-tokenized substrings 202A-202N are used as an index into the lookup tables 203A-203N. In order to do this, the lookup tables 203A-203N ($R_i$) for i need to be in the range (min_length . . . max_length) for the size of the length of $P_i$. For illustrative purposes, consider the following example. To tokenize strings of decimal digits, the process may use five tables of length $10^2$, $10^3$, $10^4$, $10^5$, $10^6$. These tables are randomly generated and contain all possible n-digit values for each value of n. Depending on the length of the non-tokenized substrings 202A-202N, the appropriate lookup table 203 is selected. For example, if the length of the non-tokenized substring 202A is three, then the indexed lookup table 203A would be the lookup table 203 with a length of $10^3$. The lookup tables 203A-202N may be pre-generated and dynamically selected based on the pseudo-random generation of the non-tokenized substring lengths.

Once the non-tokenized string 201 (P) is partitioned into P=$P_1||P_2|| \ldots ||P_n$, the non-tokenized substrings 202A-202N are tokenized into the tokenized substrings 205A-205N T=$T_1||T_2|| \ldots ||T_n$ based on the indexing and the hash processes 204A-204N as shown in FIG. 2. In FIG. 2, $T_0$=H(s||Q) 204A where H is a suitable cryptographic hash function (e.g., Secure Hashing Algorithm-256 (SHA-256), Hash based Message Authentication Code (HMAC), Message Digest (MD) 5, etc.). It is not necessary to use the same values of s and Q in this step versus the partitioning step.

The output of the hash process 204A (the tokenized substring 205A) is used as an input into the next stage (e.g., 204B if N=three or more). For i=1 . . . n, calculate $T_i=T_{i-1}+R_{|P_i|}(P_i+H(s||Q||i))$. In other words, the cryptographic hash function H used in step 204N may be different that the one used in the previous step (e.g., 204A), but the same notation is used herein to keep things simpler and more understandable. This process implements an approach that similar to the cipher-block chaining method used in the CBC mode of the AES encryption algorithm; however the key difference of novelty is that the application of the AES algorithm is replaced by an appropriate lookup table 203 in which the lookup table 203 being used is determined by the length of the substring $P_i$.

The output of the hashing algorithms 204A-204N may produce tokenized substrings 205A-205N that are a different lengths than the corresponding non-tokenized substrings 202A-202N. For example, if the length of the non-tokenized substring 202A is five digits long, the tokenized substring 205A may be longer, equal to, or shorter than five digits long based on the particular hashing process 204A that is being used.

Assuming that both the server secret value s and the lookup tables 203A-203N ($R_i$) contain elements that were randomly generated, this method of tokenization is secure, in that recovering the non-tokenized string 201 (P) from the tokenized string 206 (T) is no easier than guessing the output of the PRNG and the values of the tokenization tables $R_i$.

This method of tokenization requires a relatively small amount of storage for the tables $R_i$ of random values versus the prior art. Existing approaches require a much larger amount of storage for similar strings. This approach can attain similar levels of security with a much smaller amount of database storage, greatly expanding the situations where it is practical to use.

Figure 3:
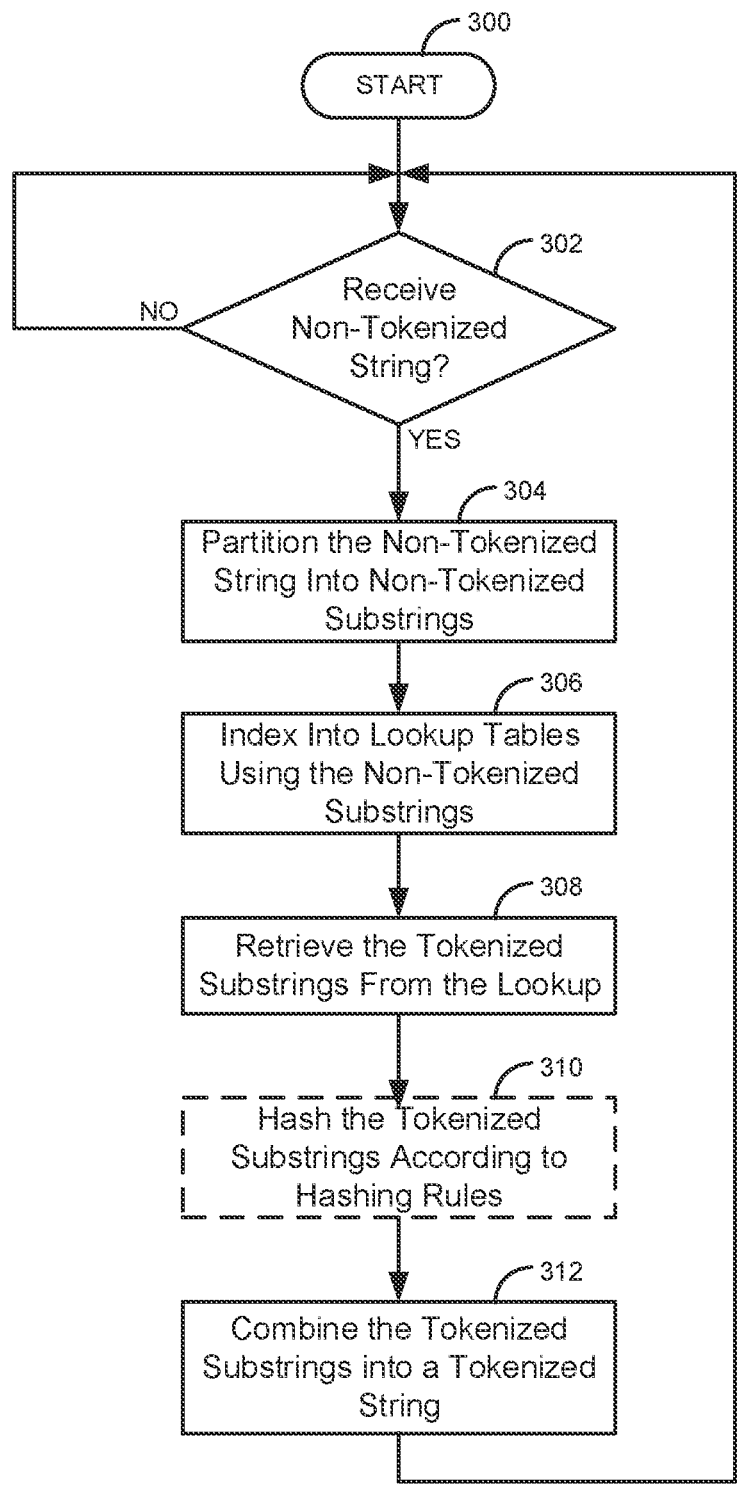
FIG. 3 is a flow diagram of a process for taking a non-tokenized string and converting it to a tokenized string.

FIG. 3 is a flow diagram of a process for taking a non-tokenized string 201 and converting it to a tokenized string 206. FIG. 3 is a flow diagram of FIG. 2.

The process starts in step 300. The process waits, in step 302, to determine if a non-tokenized string 201 has been received. If a non-tokenized string 201 has not been received in step 302, the process of step 302 repeats.

If the non-tokenized string 201 has been received in step 302, the process partitions the non-tokenized string 201 into non-tokenized substrings 202A-202N in step 304. The partitioning process of step 304 may work in the manner described in FIG. 2. The process uses the non-tokenized substrings 202A-202N as an index into the lookup tables 203A-203N in step 306. The tokenized substrings 205A-205N are retrieved from the lookup tables 203A-203N in step 308.

If hashing is to be used in step 310, the tokenized substrings 205A-205N are hashed according to rules as described previously in FIG. 2. The tokenized substrings 205A-205N are combined into the tokenized sting 206 in step 312. The process then goes back to step 302. The tokenized substring is now a secure tokenized string.

Figure 4:
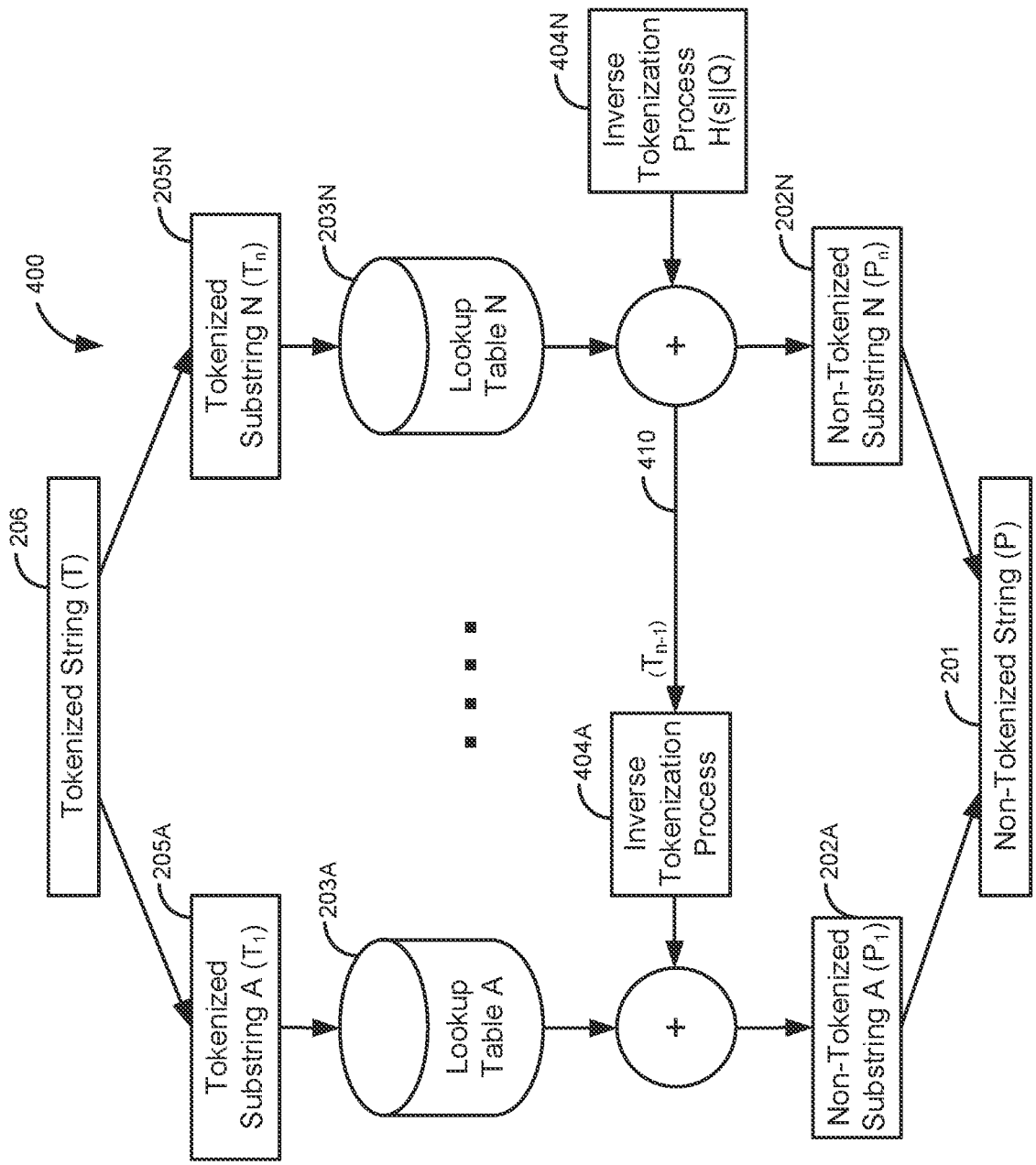
FIG. 4 is a flow/block diagram of a system for taking a tokenized string and converting it to non-tokenized string.

FIG. 4 is a flow diagram of a process 400 for taking a tokenized string 206 and converting it to non-tokenized string 201. FIG. 2 comprises the non-tokenized string 201, the non-tokenized substrings 202A-202N, the lookup tables 203A-203N, inverse tokenization processes 404A-404N, the tokenized substrings 205A-205N, and the tokenized string 206.

The tokenized string 206 is partitioned into the plurality of substrings 205A-205N. The partitioning uses the same lengths as described in FIGS. 2-3. To detokenize a tokenized substring 205, the process needs to find the index in the lookup table 203. For example, say the tokenized substring 205 "abc" is element 100 in the lookup table 204. The value 100 is the sum of two things: the index to get the non-tokenized substring 202 and the hash that was used to originally tokenize the tokenized substring 205. The detokenization process has everything that it needs to do an inverse tokenization to determine the non-tokenized substring 202. Let's assume that that the inverse tokenization of the value "abc" happens to be 10. That tells the system that value 100 is really the sum of the inverse tokenization (10) plus 90. The value of 90 is used to index into the lookup table 203 to get the non-tokenized substring 202. The tokenized substrings 202A-202N are then combined to produce the non-tokenized substring 201.

Figure 5:
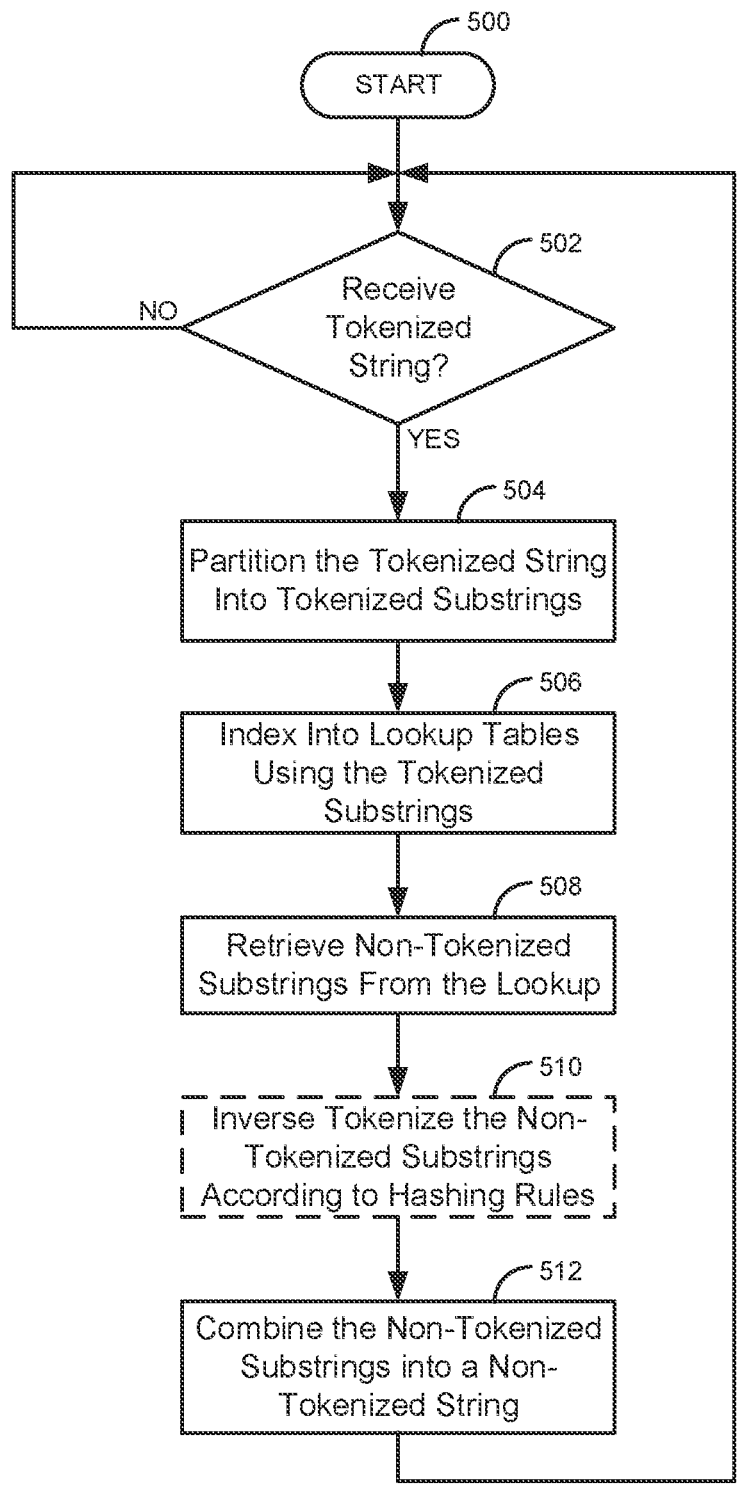
FIG. 5 is a flow diagram of a process for taking a tokenized string and converting it to non-tokenized string.

FIG. 5 is a flow diagram of a process for taking a tokenized string 206 and converting it to non-tokenized string 201. FIG. 5 is a flow diagram of FIG. 4.

The process starts in step 500. The process determines, in step 502, if a tokenized string 206 has been received. If the tokenized string 206 has not been received in step 502, the process repeats step 502. If the tokenized string 206 has been received in step 502, the process portions the tokenized sting 206 into a plurality of tokenized substrings 205A-205N in step 504.

The tokenized substrings 205A-205N are used as an index into the lookup tables 203A-203N in step 506. In response to indexing into the lookup tables 203A-203N, the non-tokenized substrings 202A-202N are retrieved in step 508. If a hashing process is used in step 510, an inverse tokenization of the non-tokenized substrings 202A-202N is performed according to hashing rules. The non-tokenized substrings 202A-202N are then combined into the non-tokenized substring 202 in step 512. The process then goes to step 502.

The above processes may be used for multiple non-tokenized strings 201. In addition, the above processes may work where there are multiple user/entities using the same lookup tables 203A-203N or where there are separate lookup tables for multiple users/entities.

The above processes may be performed in different orders as one of skill in the art would recognize. For example, the inverse tokenization step 510 may be performed before the indexing step 506. Likewise, the hashing step 310 may be performed before the indexing step 306.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
receiving, by a microprocessor, a non-tokenized string;
partitioning, by the microprocessor, the non-tokenized string into a plurality of non-tokenized substrings;
indexing, by the microprocessor, into a plurality of lookup tables using the plurality of non-tokenized substrings to retrieve a plurality of tokenized substrings;
retrieving, by the microprocessor, the plurality of tokenized substrings;
hashing, by the microprocessor, each of the retrieved plurality of tokenized substrings of the plurality of tokenized substrings using a different hashing function for each of the retrieved plurality of tokenized substrings; and
combining, by the microprocessor, the plurality of hashed tokenized substrings into a hashed tokenized string,
wherein a first value of a secret value and a first value of an encoded security policy are concatenated and used to initialize a pseudo-random number generator to partition the non-tokenized string into the plurality of non-tokenized substrings,
wherein a second value of the secret value and a second value of the encoded security policy are concatenated and used to initialize a hashing function to hash each of the plurality of tokenized substrings,
wherein the first values for the secret value and the encoded security policy are different than the second values for the secret value and the encoded security policy, and
wherein an individual length of individual ones of the plurality of non-tokenized substrings are pseudo-randomly generated by the pseudo-random number generator.

2. The method of claim 1, wherein a length of the hashed tokenized substring is different from a length of the non-tokenized string.

3. The method of claim 1, wherein an output of the hashing is used as an input that is combined with a lookup value of a non-tokenized substring in a second hashing step.

4. The method of claim 1, wherein the plurality of non-tokenized substrings are different lengths.

5. The method of claim 1,
wherein the plurality of lookup tables are dynamically selected based on the pseudo-randomly generated individual length of the individual ones of the plurality of non-tokenized substrings.

6. The method of claim 1, wherein each of the plurality of non-tokenized substrings is indexed separately into a corresponding lookup table of the plurality of lookup tables based on a length of each of the plurality of non-tokenized substrings.

7. The method of claim 1, wherein the encoded security policy links a token to an application or to an individual.

8. A system, comprising:
a microprocessor; and
a non-transitory computer readable medium, coupled with the microprocessor and comprising microprocessor readable and executable instructions that, when executed by the microprocessor, cause the microprocessor to:
receive a non-tokenized string;
partition the non-tokenized string into a plurality of non-tokenized substrings;
index into a plurality of lookup tables using the plurality of non-tokenized substrings to retrieve a plurality of tokenized substrings;
retrieve the plurality of tokenized substrings;
hashing each of the retrieved plurality of tokenized substrings of the plurality of tokenized substrings using a different hashing function for each of the retrieved plurality of tokenized substrings; and
combine the plurality of hashed tokenized substrings into a hashed tokenized string,
wherein a first value of a secret value and a first value of an encoded security policy are concatenated and used to initialize a pseudo-random number generator to partition the non-tokenized string into the plurality of non-tokenized substrings,
wherein a second value of the secret value and a second value of the encoded security policy are concatenated and used to initialize a hashing function to hash each of the plurality of tokenized substrings,
wherein the first values for the secret value and the encoded security policy are different than the second values for the secret value and the encoded security policy,
wherein an individual length of individual ones of the plurality of non-tokenized substrings are pseudo-randomly generated by the pseudo-random number generator, and
wherein an individual length of individual ones of the plurality of non-tokenized substrings are pseudo-randomly generated by the pseudo-random number generator.

9. The system of claim 8, wherein a length of the hashed tokenized substring is different from a length of the non-tokenized string.

10. The system of claim 8, wherein an output of the hashing is used as an input that is combined with a lookup value of a non-tokenized substring in a second hashing step.

11. The system of claim 8, wherein the plurality of non-tokenized substrings are different lengths.

12. The system of claim 8,
wherein the plurality of lookup tables are dynamically selected based on the pseudo-randomly generated individual length of the individual ones of the plurality of non-tokenized substrings.

13. The system of claim 8, wherein each of the plurality of non-tokenized substrings is indexed separately into a corresponding lookup table of the plurality of lookup tables based on a length of each of the plurality of non-tokenized substrings.

14. The system of claim 8, wherein the encoded security policy links a token to an application or to an individual.

15. A method, comprising:
receiving, by a microprocessor, a tokenized string;
partitioning, by the microprocessor, the tokenized string into a plurality of tokenized substrings;
using, by the microprocessor, the plurality of tokenized substrings to index into a plurality of tokenization tables to retrieve a plurality of non-tokenized substrings;
retrieving the plurality of non-tokenized substrings;
inverse tokenizing by hashing, by the microprocessor, each of the retrieved plurality of non-tokenized substrings of the plurality of non-tokenized substrings using a different inverse tokenizing function for each of the retrieved plurality of non-tokenized substrings; and
combining the plurality of non-tokenized substrings into a non-tokenized string,
wherein a first value of a secret value and a first value of an encoded security policy are concatenated and used to initialize a pseudo-random number generator to partition the tokenized string into the plurality of tokenized substrings,
wherein a second value of the secret value and a second value of the encoded security policy are concatenated and used to initialize a hashing function to hash each of the plurality of non-tokenized substrings,
wherein the first values for the secret value and the encoded security policy are different than the second values for the secret value and the encoded security policy, and
wherein an individual length of individual ones of the plurality of tokenized substrings are pseudo-randomly generated by the pseudo-random number generator.

16. The method of claim 15, wherein each of the plurality of tokenized substrings is indexed separately into a corresponding tokenization table of the plurality of tokenization tables based on a length of each of the plurality of tokenized substrings.

17. The method of claim 15, wherein the encoded security policy links a token to an application or to an individual.

18. A system, comprising:
a microprocessor; and
a non-transitory computer readable medium, coupled with the microprocessor and comprising microprocessor readable and executable instructions that, when executed by the microprocessor, cause the microprocessor to:
receive a tokenized string;
partition the tokenized string into a plurality of tokenized substrings;
use the plurality of tokenized substrings to index into a plurality of tokenization tables to retrieve the plurality of non-tokenized substrings;
retrieve a plurality of non-tokenized substrings;
inverse tokenizing by hashing, each of the retrieved plurality of non-tokenized substrings of the plurality of non-tokenized substrings using a different inverse tokenizing function for each of the retrieved plurality of non-tokenized substrings; and
combine the plurality of non-tokenized substrings into a non-tokenized string,
wherein a first value of a secret value and a first value of an encoded security policy are concatenated and used to initialize a pseudo-random number generator to partition the tokenized string into the plurality of tokenized substrings,
wherein a second value of the secret value and a second value of the encoded security policy are concatenated and used to initialize a hashing function to hash each of the plurality of non-tokenized substrings, wherein the first values for the secret value and the encoded security policy are different than the second values for the secret value and the encoded security policy, and wherein an individual length of individual ones of the plurality of tokenized substrings are pseudo-randomly generated by the pseudo-random number generator.

19. The system of claim 18, wherein each of the plurality of tokenized substrings is indexed separately into a corresponding tokenization table of the plurality of tokenization tables based on a length of each of the plurality of tokenized substrings.

20. The system of claim 18, wherein the encoded security policy links a token to an application or to an individual.

\* \* \* \* \*